US010694224B2

(12) United States Patent
Kwon et al.

(10) Patent No.: US 10,694,224 B2
(45) Date of Patent: Jun. 23, 2020

(54) DISPLAY APPARATUS FOR PLAYING SUBSTITUTIONAL ADVERTISEMENT AND CONTROL METHOD THEREOF

(71) Applicant: SAMSUNG ELECTRONICS CO., LTD., Suwon-si (KR)

(72) Inventors: Oh In Kwon, Suwon-si (KR); Min Gu Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 130 days.

(21) Appl. No.: 15/896,556

(22) Filed: Feb. 14, 2018

(65) Prior Publication Data

US 2018/0234713 A1 Aug. 16, 2018

(30) Foreign Application Priority Data

Feb. 14, 2017 (KR) ........................ 10-2017-0020156

(51) Int. Cl.
| H04N 21/234 | (2011.01) |
| H04N 21/81 | (2011.01) |
| H04N 21/44 | (2011.01) |
| H04N 21/4402 | (2011.01) |
| H04N 21/458 | (2011.01) |

(52) U.S. Cl.
CPC . *H04N 21/23424* (2013.01); *H04N 21/23406* (2013.01); *H04N 21/4402* (2013.01); *H04N 21/44016* (2013.01); *H04N 21/458* (2013.01); *H04N 21/812* (2013.01)

(58) Field of Classification Search
CPC ....... H04N 21/23424; H04N 21/23406; H04N 21/44016; H04N 21/4402; H04N 21/458; H04N 21/812; H04N 21/440218
See application file for complete search history.

(56) References Cited

U.S. PATENT DOCUMENTS

| 6,611,624 | B1 | 8/2003 | Zhang et al. |
| 7,930,716 | B2 | 4/2011 | Liga et al. |
| 8,082,355 | B1 | 12/2011 | Weber et al. |
| 8,584,159 | B2 | 11/2013 | Di Mattia et al. |
| 8,863,165 | B2 | 10/2014 | Gordon |
| 2004/0128682 | A1 | 7/2004 | Liga et al. |
| 2009/0217316 | A1 | 8/2009 | Gupta |

(Continued)

FOREIGN PATENT DOCUMENTS

| EP | 1 441 534 A2 | 7/2004 |
| EP | 1775953 A1 | 4/2007 |

(Continued)

OTHER PUBLICATIONS

Communication dated Jul. 17, 2018, issued by the European Patent Office in counterpart European Application No. 18156332.1.

*Primary Examiner* — Chenea Davis
(74) *Attorney, Agent, or Firm* — Sughrue Mion, PLLC

(57) ABSTRACT

A display apparatus includes a communication interface connected to a broadcasting server and an advertisement server, a display, a first scaler converting a broadcasting image stream, which is received from the broadcasting server, to a specified format, a second scaler converting a substitutional advertisement image stream received from the advertisement server, to the specified format, and a processor controlling the first scaler and the second scaler to display an image on the display.

20 Claims, 5 Drawing Sheets

(56) References Cited

U.S. PATENT DOCUMENTS

| | | |
|---|---|---|
| 2012/0059949 A1 | 3/2012 | Weber et al. |
| 2012/0117584 A1 | 5/2012 | Gordon |
| 2012/0254913 A1 | 10/2012 | Di Mattia et al. |
| 2013/0125171 A1* | 5/2013 | Sharif-Ahmadi ....... H04L 41/12 725/43 |
| 2015/0089526 A1 | 3/2015 | Gordon |
| 2017/0094351 A1* | 3/2017 | Gordon ................ H04N 21/254 |

FOREIGN PATENT DOCUMENTS

| | | |
|---|---|---|
| EP | 2 093 967 A2 | 8/2009 |
| EP | 2282525 A1 | 2/2011 |
| WO | 01/93474 A2 | 12/2001 |

* cited by examiner

DISPLAY APPARATUS FOR PLAYING SUBSTITUTIONAL ADVERTISEMENT AND CONTROL METHOD THEREOF

CROSS-REFERENCE TO RELATED APPLICATION(S)

This application claims priority from Korean Patent Application No. 10-2017-0020156, filed on Feb. 14, 2017 in the Korean Intellectual Property Office, the entire disclosure of which is hereby incorporated by reference.

BACKGROUND

1. Field

Exemplary embodiments relate to a display apparatus that plays a substitutional advertisement, and a control method of the display apparatus.

2. Description of Related Art

With the development of various types of electronic devices as well as the development of a broadcasting technology and an Internet communication technology, a variety of content may be provided to a user. In particular, thanks to the development of a mobile device such as a notebook personal computer (PC), a smartphone, a tablet PC, or the like, the mobile device may provide a user with the variety of content.

As well as providing the same content to a plurality of users unilaterally by using the mobile device, it may be possible to provide the plurality of users with different content by using user information of the mobile device.

SUMMARY

When substituting a broadcasting image with a substitutional advertisement image to display the substitutional advertisement image, the format of which is different from the format of the broadcasting image, in a display, a display apparatus may convert the substitutional advertisement image to a specified format through a scaler. A scaler may also be referred to as an image format converter. To convert the substitutional advertisement image to the specified format through the scaler, the display apparatus may set the setting value of the scaler, depending on the format of the substitutional advertisement image. For example, when substituting the broadcasting image with the substitutional advertisement image to display the substitutional advertisement image, the display apparatus transitions from a display of the broadcasting image or of the substitutional advertisement image in the display during a specified time. For example, the display apparatus may perform an image transition to seamlessly display the substitutional advertisement image in the display when substituting (replacing) the broadcasting image with the substitutional advertisement image. In general, an image is represented by a sequence of frames, and the sequence of frames may be referred to as an image stream.

The display apparatus according to various exemplary embodiments may convert the substitutional advertisement image to the specified format in advance to store the converted image. Accordingly, the display apparatus may seamlessly display the substitutional advertisement image in a display when substituting the broadcasting image with the substitutional advertisement image to display the substitutional advertisement image.

In accordance with an aspect an exemplary embodiment, there is provided a display apparatus including a communication interface configured to connect to a broadcasting server and to an advertisement server; a display; a first scaler configured to convert a broadcasting image stream; a second scaler configured to convert a substitutional advertisement image stream; and a processor configured to control the first scaler and to control the second scaler, wherein the processor is configured to: receive the broadcasting image stream from the broadcasting server through the communication interface; display, on the display, a broadcasting image stream converted by the first scaler in a specified format; receive, through the communication interface from the advertisement server, the substitutional advertisement image stream and information about the substitutional advertisement image stream; configure the second scaler, based on the information, to convert a format of the substitutional advertisement image stream to the specified format; and display, on the display, a converted substitutional advertisement image stream in the specified format instead of displaying a portion of the converted broadcasting image stream.

In accordance with an aspect of another exemplary embodiment, there is provided a control method of a display apparatus, the control method including: receiving a broadcasting image stream from a broadcasting server; displaying a converted broadcasting image stream on a display of the display apparatus, wherein the converted broadcasting image stream is produced by operation of a first scaler of the display apparatus on the broadcasting image stream; receiving a substitutional advertisement image stream and information about the substitutional advertisement image stream from an advertisement server; configuring a second scaler of the display apparatus, based on the information, to convert a format of the substitutional advertisement image stream to a first format; converting, by the second scaler, the substitutional advertisement image stream to the first format; and displaying, on the display, the converted substitutional advertisement image stream instead of displaying a portion of the converted broadcasting image stream.

In accordance with an aspect of another exemplary embodiment, there is provided a non-transitory computer-readable recording medium having recorded thereon a program performing a method including receiving a broadcasting image stream from a broadcasting server; displaying a converted broadcasting image stream on a display of the display apparatus, wherein the converted broadcasting image stream is produced by operation of a first scaler of the display apparatus on the broadcasting image stream; receiving, from an advertisement server, a substitutional advertisement image stream and first information about the substitutional advertisement image stream; configuring a second scaler of the display, based on the information to convert a format of the substitutional advertisement image stream to a specified format; and displaying, on the display the converted substitutional advertisement image stream in the specified format on the display instead of displaying a portion of the converted broadcasting image stream.

According to an exemplary embodiment, a display apparatus and a control method of the display apparatus may include a plurality of scalers, each of which converts an image to a specified format, when substituting a broadcasting image received from a broadcasting server with a substitutional advertisement image to display the substitutional advertisement image, the format of which is different from the format of the broadcasting image, in a display. For example, a portion of a broadcasting image stream may be replaced with a substitutional image stream for presentation on a display screen, wherein the display includes a display screen for image presentation to a user. Accordingly, the display apparatus and the control method of the display apparatus may convert the substitutional advertisement image to a specified format in advance to seamlessly display the substitutional advertisement image in a display at a point in time when the substitutional advertisement is played.

BRIEF DESCRIPTION OF THE DRAWINGS

The above and/or other aspects will be more apparent from the following description of exemplary embodiments taken in conjunction with the accompanying drawings, in which.

DETAILED DESCRIPTION

Hereinafter, various exemplary embodiments will be described with reference to accompanying drawings. However, those of ordinary skill in the art will recognize that modification, equivalent, and/or alternative on the various exemplary embodiments described herein can be variously made without departing from the scope and spirit of the present invention. With regard to the drawings, similar reference numbers are used to depict the same or similar elements, features, and structures. Herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Figure 1:
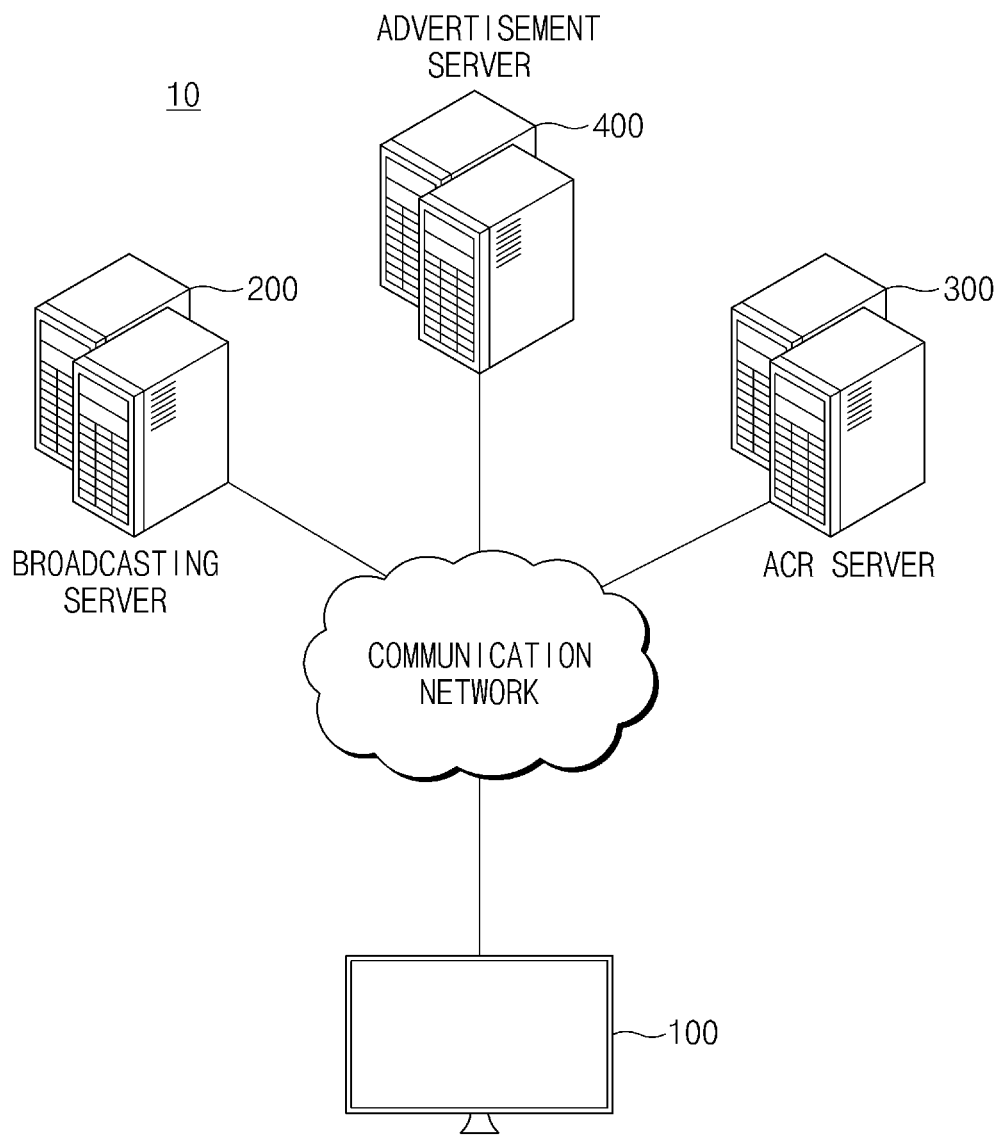
FIG. 1 is a view illustrating a substitutional advertisement system, according to various exemplary embodiments.

FIG. 1 is a view illustrating a substitutional advertisement system, according to various exemplary embodiments.

Referring to FIG. 1, a substitutional advertisement system 10 may include a display apparatus 100, a broadcasting server 200, an automatic content recognition (ACR) server 300, and an advertisement server 400. The display apparatus 100 may play content and an advertisement, which are received from the broadcasting server 200. The content and the advertisement may include an image signal (e.g., a video image) and an audio signal.

The display apparatus 100 may receive a broadcasting image from the broadcasting server 200. For example, the display apparatus 100 may be connected to the broadcasting server 200 through a communication network (e.g., a RF communication network or an IP communication network) to receive the broadcasting image. For example, the broadcasting image may include a content image (e.g., a broadcasting program) or an advertisement image.

According to an exemplary embodiment, the display apparatus 100 may display the broadcasting image in a display. For example, the display apparatus 100 may display the received broadcasting image in the display in a specified format (e.g., a color format, a resolution, or a bit rate). According to an exemplary embodiment, the display apparatus 100 may convert the received image to the specified format. For example, the display apparatus 100 may convert the received image to the specified format through a scaler. A scaler may also be referred to as an image format converter. The display apparatus 100 may change a setting value of the scaler depending on the format of an image to be input to the scaler to convert the format of the input image to the specified format.

According to another exemplary embodiment, the display apparatus 100 may receive the broadcasting image from a broadcast receiving apparatus (e.g., a set-top box) (not illustrated). For example, the display apparatus 100 may be connected to the broadcast receiving apparatus by wire (e.g., a high definition multimedia interface (HDMI) or the like) or wirelessly (e.g., wireless-fidelity (Wi-Fi) or the like) so as to receive the broadcasting image. For example, the broadcast receiving apparatus may be connected to the broadcasting server 200 over a communication network so as to receive the broadcasting image and may transmit the received broadcasting image to the display apparatus 100. A user interface (UI) image generated by the broadcast receiving apparatus may be blended in the broadcasting image received from the broadcast receiving apparatus. (or, broadcasting image stream) received from the broadcast receiving apparatus. For example, a portion of a broadcasting image stream may be replaced with a substitutional image stream for presentation on a display screen, wherein the display includes a display screen for image presentation to a user.

According to an exemplary embodiment, the display apparatus 100 may receive information of a channel corresponding to an image displayed in a display, from the ACR server 300. For example, the display apparatus 100 may be connected to the ACR server 300 through a communication network (e.g., an IP communication network) so as to receive the channel information. The display apparatus 100 may transmit image identification information generated based on the image displayed in the display, to the ACR server 300 and may receive channel information corresponding to the image identification information.

According to an exemplary embodiment, the display apparatus 100 may receive a substitutional advertisement image from the advertisement server 400. For example, the display apparatus 100 may be connected to the advertisement server 400 through the communication network (e.g., the IP communication network) so as to receive the substitutional advertisement image. The display apparatus 100 may receive the substitutional advertisement image, which will substitute an advertisement image of a broadcasting image received from the broadcasting server 200, based on the channel information received from the ACR server 300. According to an exemplary embodiment, the display apparatus 100 may substitute the broadcasting image received from the broadcasting server 200 to display the substitutional advertisement image in a display. For example, the substitutional advertisement image may be displayed in the display by substituting an advertisement image included in the broadcasting image received from the broadcasting server 200.

According to an exemplary embodiment, the display apparatus 100 may be implemented with various devices, which are able to receive content from an external device and to display the content, such as a TV, a desktop, a notebook PC, a smartphone, a tablet PC, a monitor, an electronic frame, and the like.

The broadcasting server 200 may transmit the broadcasting image to the display apparatus 100. For example, the broadcasting server 200 may transmit the broadcasting image corresponding to a channel selected by the display apparatus 100, to the display apparatus 100. For example, the broadcasting image may include a content image (e.g., a broadcasting program) and an advertisement image. According to an exemplary embodiment, the broadcasting server 200 may transmit information about the broadcasting image to the display apparatus 100 together with the broadcasting image. For example, the information about the broadcasting image may include information about the format (e.g., a color format, a resolution, or a bit rate) of the broadcasting image.

The ACR server 300 may verify a channel corresponding to the broadcasting image displayed in the display apparatus 100. For example, the ACR server 300 may verify a channel corresponding to the image displayed in the display apparatus 100, based on image identification information received from the display apparatus 100. According to an exemplary embodiment, the ACR server 300 may transmit information about the verified channel (or channel information) to the display apparatus 100.

The advertisement server 400 may transmit a substitutional advertisement to the display apparatus 100. For example, the advertisement server 400 may receive a request for the substitutional advertisement, from the display apparatus 100 and may transmit the substitutional advertisement image to the display apparatus 100 depending on the request.

When substituting a broadcasting image with a substitutional advertisement image to display the substitutional advertisement image, the format of which is different from the format of the broadcasting image, in a display, the display apparatus 100 may convert the substitutional advertisement image to a specified format through a scaler. To convert the substitutional advertisement image to a specified format through the scaler, the display apparatus 100 may set (or reset) the setting value of the scaler, depending on the format of the substitutional advertisement image. A reset operation may also be referred to as a configuration operation. Thus, the display apparatus 100 may configure the scaler based on the format of the substitutional advertisement message. As such, when substituting (replacing) the broadcasting image to display the substitutional advertisement image, the display apparatus 100 transitions to display the broadcasting image or the substitutional advertisement image in the display during a specified time. In other words, the display apparatus 100 may replace the broadcasting image to transition to a display of the substitutional advertisement image in the display in a seamless manner. For example, a temporal transition boundary may be defined based in part on a display period, Td (see FIG. 4, first time point t1). At an end of a playback time, tp, of the substitutional advertisement, the display apparatus may transition from the substitutional advertisement image to a broadcasting image based on a temporal transition boundary corresponding to an end of the time tp (see FIG. 4 second time point t2). The display apparatus 100 according to various exemplary embodiments may convert the substitutional advertisement image to a specified format in advance to store the converted image, and thus the display apparatus 100 may seamlessly display the substitutional advertisement image in a display when substituting (replacing) the broadcasting image to display the substitutional advertisement image.

Figure 2:
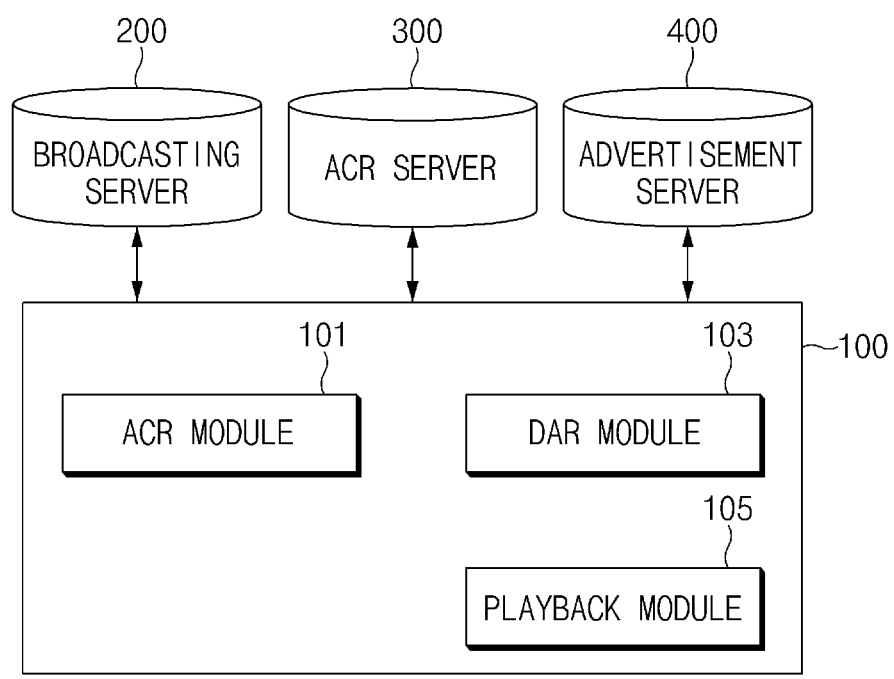
FIG. 2 is a view illustrating a method in which a display apparatus displays a substitutional advertisement image in a display, according to an exemplary embodiment.

FIG. 2 is a view illustrating a method in which a display apparatus displays a substitutional advertisement image in a display, according to an exemplary embodiment.

Referring to FIG. 2, a program module (e.g., an application module) included in the display apparatus 100 may include an ACR module 101, a Digital Audio Recorder (DAR) module 103, and a playback module 105. These program modules may be stored in a memory and executed by a processor 190 to perform their respective operations. The display apparatus 100 may substitute the broadcasting image received from the broadcasting server 200 to display, in a display, the substitutional advertisement image received from the advertisement server 400.

The ACR module 101 may generate image identification information based on an image displayed in a display 163. For example, the ACR module 101 may capture the image displayed in the display 163 and may generate image identification information (fingerprint information or watermark information) by using the captured image. For example, the ACR module 101 may reduce the size of the captured image and may extract minutiae representing the captured image to generate fingerprint information. For another example, the ACR module 101 may extract a unique watermark inserted into the captured image to generate watermark information. According to an exemplary embodiment, the ACR module 101 may transmit the image identification information to the ACR server 300.

According to an exemplary embodiment, the ACR server 300 may receive the image identification information to verify a channel corresponding to the image identification information. For example, the ACR server 300 may include a database that stores the image identification information corresponding to each broadcasting channel. The ACR server 300 may compare the image identification information received from the ACR module 101 with image identification information for each broadcasting channel, which is stored in the database, to verify the channel (or channel information) corresponding to the image identification information.

According to an exemplary embodiment, the ACR server 300 may verify a broadcasting schedule (e.g., a broadcasting program schedule or an advertisement schedule) of the channel corresponding to the verified channel information. For example, the ACR server 300 may determine whether a substitutable advertisement is included in the channel corresponding to the channel information, by using broadcasting schedules of a plurality of channels stored in the database. If a substitutable advertisement is included in the channel corresponding to the channel information, the ACR server 300 may verify information (e.g., the start time of an advertisement, identification information of the advertisement, or the like) about the substitutable advertisement. The ACR server 300 may transmit, to the display apparatus 100, the channel information and the information about the substitutable advertisement of the channel corresponding to the channel information. According to an exemplary embodiment, at least part of operations performed by the ACR server 300 may be performed by the ACR module 101.

According to an exemplary embodiment, if the information about the substitutable advertisement is received from the ACR server 300, the DAR module 103 may transmit, to the advertisement server 400, a request (or a substitutional advertisement request) for receiving a substitutional advertisement. The substitutional advertisement request may include information necessary for the advertisement server 400 to select the substitutional advertisement. For example, the substitutional advertisement request may include the information about the substitutable advertisement and user profile information (e.g., a residence area, gender, age, interest, or the like).

According to an exemplary embodiment, the advertisement server 400 may transmit the substitutional advertisement (or a substitutional advertisement image) to the display apparatus 100 in response to the request of the DAR module 103. According to an exemplary embodiment, the advertisement server 400 may select the substitutional advertisement based on at least one of the information about the substitutable advertisement included in the substitutional advertisement request and the user profile information and may transmit the selected substitutional advertisement to the display apparatus 100. According to an exemplary embodiment, the advertisement server 400 may transmit information about the substitutional advertisement image to the display apparatus 100 together with the substitutional advertisement image. For example, the information about the substitutional advertisement image may include information about the format (e.g., a color format, a resolution, or a bit rate) of the substitutional advertisement image.

According to an exemplary embodiment, the DAR module 103 may convert the received substitutional advertisement image to a specified format (e.g., a color format, a resolution, or a bit rate) to store the converted substitutional advertisement image in a memory (e.g., a buffer). According to an exemplary embodiment, the DAR module 103 may display the substitutional advertisement image stored in the memory, in a display through the playback module 105 at an advertisement starting time of the substitutional advertisement image.

According to an exemplary embodiment, the playback module 105 may play and output the substitutional advertisement received from the advertisement server 400. According to an exemplary embodiment, the playback module 105 may display the substitutional advertisement image in the display 163. For example, the playback module 105 may substitute the advertisement image received from the broadcasting server 200, with the substitutional advertisement image to display the substitutional advertisement image in the display 163. The substitutional advertisement image may be an image obtained by blending, by the DAR module 103, a UI image generated by a UI recognition module. According to an exemplary embodiment, the playback module 105 may output an audio signal included in the substitutional advertisement through a speaker in synchronization with the substitutional advertisement image.

Figure 3:
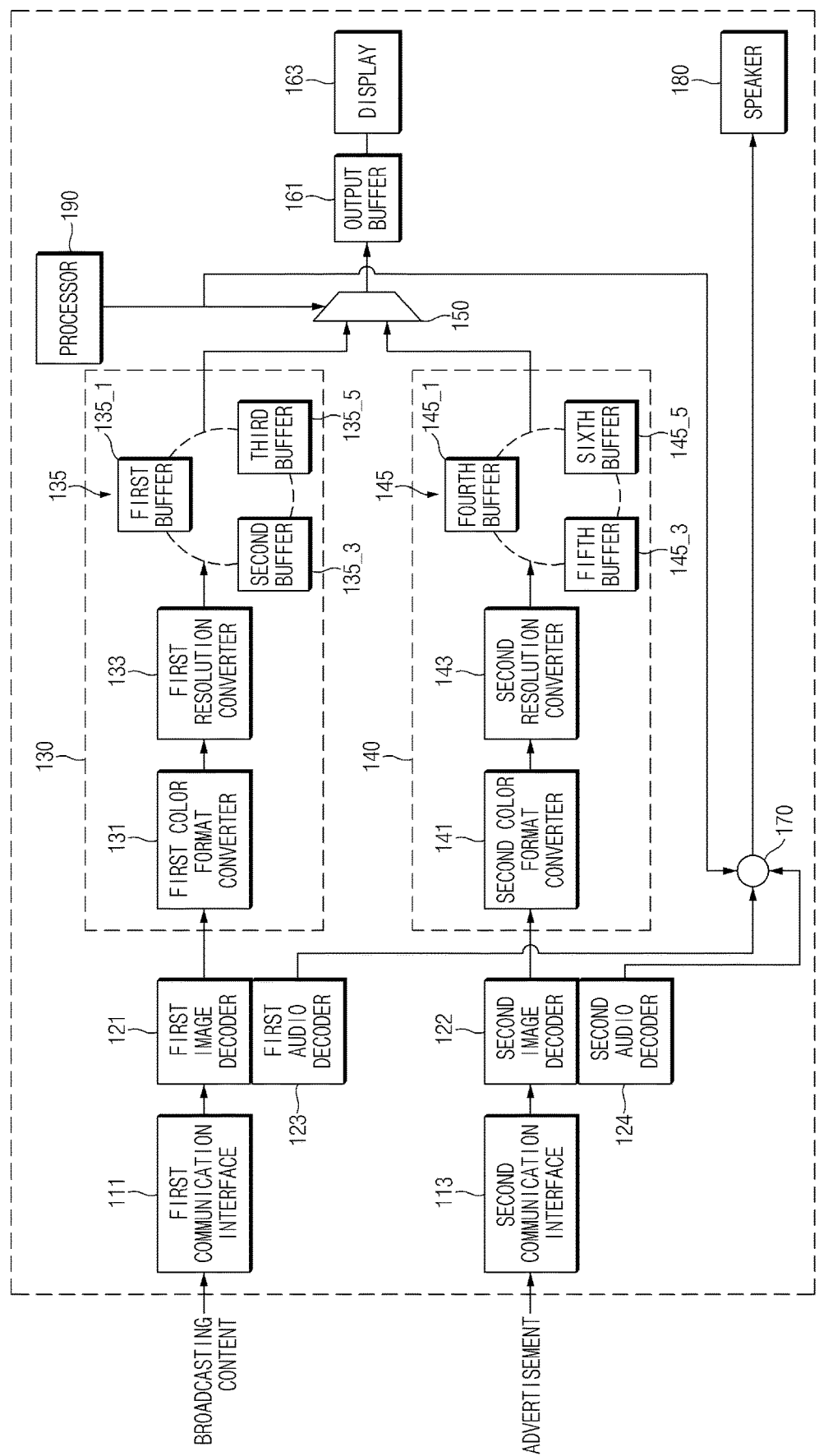
FIG. 3 is a block diagram illustrating a configuration of a display apparatus, according to an exemplary embodiment.

FIG. 3 is a block diagram illustrating a configuration of a display apparatus, according to an exemplary embodiment.

Referring to FIG. 3, the display apparatus 100 may include a first communication interface 111, a second communication interface 113, a first image decoder 121, a second image decoder 122, a first audio decoder 123, a second audio decoder 124, a first scaler 130, a second scaler 140, an image source selecting module 150, an output buffer 161, the display 163, an audio source selecting module 170, a speaker 180, and the processor 190. The communication interfaces 111 and 113 may be referred to collectively as a display apparatus communication interface.

The first communication interface 111 may be connected to the broadcasting server 200 so as to receive broadcasting content. The broadcasting content may include a broadcasting image (e.g., a content image and an advertisement image) and a broadcasting audio signal. The second communication interface 113 may be connected to the advertisement server 400 so as to receive an advertisement. The advertisement may include an advertisement image and an advertisement audio signal.

The first image decoder 121 may decode the broadcasting image received from the broadcasting server 200. For example, the first image decoder 121 may receive an encoded broadcasting image from the broadcasting server 200. The first image decoder 121 may decode the received broadcasting image in a decoding method corresponding to the encoding method (e.g., Moving Picture Experts Group 1 (MPEG1), Moving Picture Experts Group 2 (MPEG2), H.264, or the like) of the received broadcasting image. For example, the decoded broadcasting image may be an image generated in a format different from a format (e.g., a color format, a resolution, or a bit rate) configured to display an image in the display 163. According to an exemplary embodiment, the first image decoder 121 may transmit the decoded broadcasting image to the first scaler 130.

The second image decoder 122 may decode the advertisement image received from the advertisement server 400. For example, the second image decoder 122 may receive the encoded advertisement image from the advertisement server 400. The second image decoder 122 may decode the received advertisement image in a decoding method corresponding to the encoding method (e.g., MPEG4, H.263, or the like) of the received advertisement image. For example, the decoded advertisement image may be an image generated in a format different from the format of the broadcasting image. According to an exemplary embodiment, the second image decoder 122 may transmit the decoded advertisement image to the second scaler 140.

The first audio decoder 123 and the second audio decoder 124 may decode the broadcasting audio signal and the advertisement audio signal, respectively. For example, the first audio decoder 123 may receive the encoded broadcasting audio signal from the broadcasting server 200. Each of the first audio decoder 123 and the second audio decoder 124 may decode the received audio signal in a decoding method corresponding to the encoding method (e.g., MPEG-1 Audio Layer-3 (MP3), MPEG-2/4 Audio (AAC), or the like) of the received audio signal. According to an exemplary embodiment, the first audio decoder 123 and the second audio decoder 124 may transmit the decoded broadcasting audio signal and the decoded advertisement audio signal to the speaker 180 through the audio source selecting module 170.

The first scaler 130 may include a first color format converter 131, a first resolution converter 133, and a first ring buffer 135. The first scaler 130 may receive the decoded broadcasting image and may convert the received broadcasting image to a specified format. For example, the specified format may be a format set to display an image in the display 163. According to an exemplary embodiment, the first color format converter 131 may convert the color format (e.g., an RGB format, an RGGB format, or a YUV format) of a broadcasting image to a specified color format. According to an exemplary embodiment, the first resolution converter 133 may convert the resolution (e.g., 640×480, 1280×720, 1920×1080, or the like) of a broadcasting image to the specified resolution. According to an exemplary embodiment, the first ring buffer 135 may include a plurality of buffers 135_1, 135_3, and 135_5. The first ring buffer 135 may include a plurality of buffers 135_1, 135_3, and 135_5 and may have a structure in which data is written and read circularly. The first ring buffer 135 may store the frame of the broadcasting image, the color format and the resolution of which are converted to the specified format and the specified resolution, in the plurality of buffers 135_1, 135_3, and 135_5. For example, the frame rate of the broadcasting image may be converted to the specified frame rate through the first ring buffer 135. For example, in the case where the frame rate of the received broadcasting image is higher than the specified frame rate, the remaining frames other than some frame may be stored in the first ring buffer 135. For another example, in the case where the frame rate of the received broadcasting image is lower than the specified frame rate, some frame may be copied and stored.

The second scaler 140 may include a second color format converter 141, a second resolution converter 143, and a second ring buffer 145. The second scaler 140 may receive the decoded substitutional advertisement image and may convert the received substitutional advertisement image to a specified format. The second color format converter 141 may convert the color format of the substitutional advertisement image to a specified format. According to an exemplary embodiment, the second resolution converter 143 may convert the resolution of the substitutional advertisement image to a specified format. According to an exemplary embodiment, the second ring buffer 145 may include a plurality of buffers 145_1, 145_3, and 145_5. The second ring buffer 145 may store the frame of the substitutional advertisement image, the color format and the resolution of which is converted to the specified format and the specified resolution, in the plurality of buffers 145_1, 145_3, and 145_5. For example, the frame rate of the advertisement image may be converted to the specified frame rate through the second ring buffer 145.

The image source selecting module 150 may select a source image (e.g., a broadcasting image or a substitutional advertisement image) displayed in the display 163. For example, the image source selecting module 150 may select one of the first ring buffer 135 and the second ring buffer 145 and may copy the frame of an image stored in the selected ring buffer, in the output buffer 161. For example, the image source selecting module 150 may copy the frame stored in the first ring buffer 135 or the second ring buffer 145, in a direct memory access (DMA) scheme.

The image frame stored in the output buffer 161 may be displayed in the display 163. For example, the frame of the broadcasting image or the frame of the advertisement image stored by the image source selecting module 150 may be sequentially displayed in the display 163. According to an exemplary embodiment, the output buffer 161 may be included in the display 163. In other words, the output buffer 161 may be a buffer included in the display 163.

The audio source selecting module 170 may select an audio signal (e.g., a broadcasting audio signal or a substitutional advertisement audio signal) to be output to the speaker 180. The audio signal (or the decoded audio signal) selected by the audio source selecting module 170 may be output to the speaker 180.

The processor 190 may control overall operations of the display apparatus 100. For example, the processor 190 may control the first communication interface 111, the second communication interface 113, the first image decoder 121, the first audio decoder 123, the second image decoder 122, the second audio decoder 124, the first scaler 130, the second scaler 140, the image source selecting module 150, the output buffer 161, the display 163, the audio source selecting module 170, and the speaker 180 such that the received broadcasting content or advertisement is selectively output.

According to an exemplary embodiment, the processor 190 may receive a broadcasting image from the broadcasting server 200 through the first communication interface 111.

The processor 190 may decode the received broadcasting image through the first image decoder 121.

According to an exemplary embodiment, the processor 190 may convert the decoded broadcasting image to a specified format through the first scaler 130. For example, the processor 190 may reset (or set) the first scaler 130 (or the first color format converter 131, the first resolution converter 133, and the first ring buffer 135) based on information about the received broadcasting image and may convert the broadcasting image to a specified format. For example, the information about the broadcasting image may include information (e.g., a color format, a resolution, or a bit rate) about the format of the broadcasting image. According to an exemplary embodiment, the processor 190 may store the frame of the converted broadcasting image in the first ring buffer 135.

According to an exemplary embodiment, the processor 190 may control the image source selecting module 150 to copy the frame of a broadcasting image stored in the first ring buffer 135, in the output buffer 161. The frame of the broadcasting image stored in the output buffer 161 may be displayed in the display 163. As such, the display apparatus 100 may display the broadcasting image received from the broadcasting server 200, in the display 163.

According to an exemplary embodiment, the processor 190 may receive the substitutional advertisement image from the advertisement server 400 through a second communication interface 113. For example, if receiving information about the substitutable advertisement of the verified channel from the ACR server 300, the processor 190 may transmit, to the advertisement server 400, a request for receiving the substitutional advertisement image to receive the substitutional advertisement image corresponding to the request. According to an exemplary embodiment, the processor 190 may decode the received substitutional advertisement image through the second image decoder 122.

According to an exemplary embodiment, the processor 190 may convert the decoded substitutional advertisement image to a specified format through the second scaler 140. For example, the processor 190 may reset (or set) the second scaler 140 (or the second color format converter 141, the second resolution converter 143, and the second ring buffer 145) based on information about the received substitutional advertisement image and may convert the received substitutional advertisement image in a specified format. For example, the information about the substitutional advertisement image may include information (e.g., a color format, a resolution, or a bit rate) about the format of the substitutional advertisement image.

According to an exemplary embodiment, the processor 190 may store the frame of the converted substitutional advertisement image in the second ring buffer 145. For example, the processor 190 may convert the substitutional advertisement image in the specified format to store an image of the converted format in the second ring buffer 145, before the advertisement time of the substitutional advertisement image.

According to an exemplary embodiment, the processor 190 may control the image source selecting module 150 to copy the frame of the substitutional advertisement image stored in the second ring buffer 145, in the output buffer 161. The frame of the substitutional advertisement image stored in the output buffer 161 may be displayed in the display 163.

Figure 4:
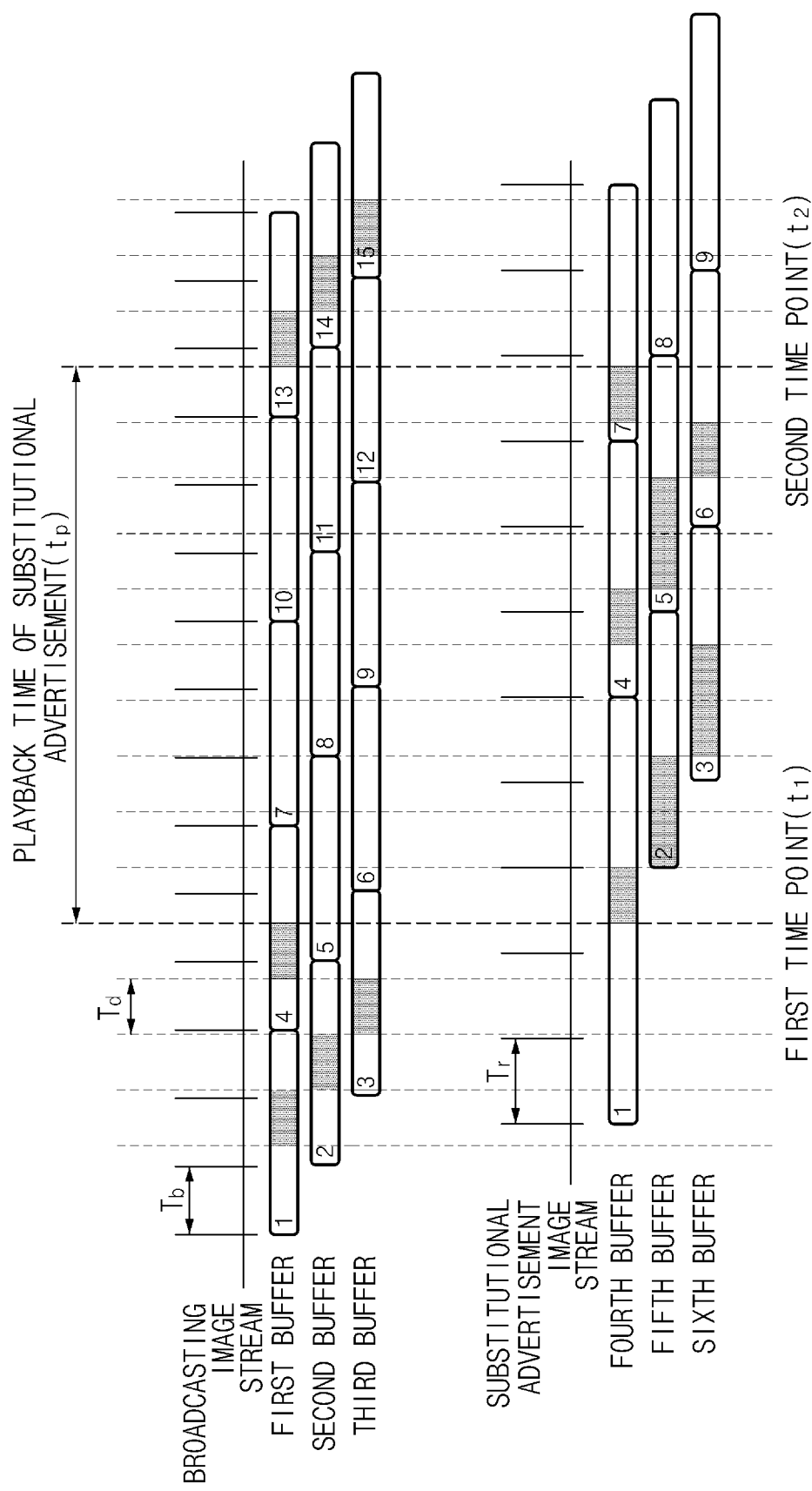
FIG. 4 is a view illustrating a process in which a display apparatus substitutes a broadcasting image with a substitutional advertisement image to provide the substitutional advertisement image, according to an exemplary embodiment.

As such, the display apparatus 100 may substitute a broadcasting image (or the advertisement image of the broadcasting image) with a substitutional advertisement image to display the substitutional advertisement image received from the advertisement server 400, in the display 163. That is the display apparatus 100 may display a substitutional advertisement image instead of a portion of a broadcasting image. A process in which a substitutional advertisement image is substituted for the broadcasting image and is displayed in the display 163 will be described in FIG. 4. FIG. 4 illustrates frames 1-15 of a broadcasting image stream making use of a ring buffer of the scaler 130 and frames 1-9 of a substitutional advertisement image stream making use of a ring buffer of the scaler 140.

According to an exemplary embodiment, the processor 190 may control the audio source selecting module 170 to output an audio signal corresponding to an image displayed in the display 163, to the speaker 180. In other words, the processor 190 may control the audio source selecting module 170 to synchronize the image displayed in the display 163 with the audio signal output to the speaker 180. For example, when the broadcasting image is displayed in the display 163, the processor 190 may output a broadcasting audio signal corresponding to the broadcasting image, to the speaker 180. For another example, when substituting the broadcasting image with a substitutional advertisement image to display the substitutional advertisement image in the display 163, the processor 190 may output the substitutional advertisement audio signal corresponding to the substitutional advertisement image, to the speaker 180.

FIG. 4 is a view illustrating a process in which a display apparatus substitutes a broadcasting image with a substitutional advertisement image to provide the substitutional advertisement image, according to an exemplary embodiment.

Referring to FIG. 4, the display apparatus 100 may substitute a broadcasting image stored in the first ring buffer 135 included in the first scaler 130 with a substitutional advertisement image to display the substitutional advertisement image stored in the second ring buffer 145 included in the second scaler 140, in a the display 163.

A frequency fd at which an image of the display apparatus 100 is output may be different from a frequency fb of a broadcasting image received from the broadcasting server 200 or a frequency fr of a substitutional advertisement image received from the advertisement server 400. For example, a period Td (=1/fd) at which the frame of an image is updated in the display 163 of the display apparatus 100 may be different from a period Tb (=1/fb) at which the frame of the broadcasting image is updated. A collection of consecutive frames may be referred to as a stream. Thus, the period between frames of a broadcasting stream is Tb. A substitutional advertisement stream may be characterized by a period Tr (=1/fr) between updates of a substitutional advertisement image.

The number of buffers included in each of the first ring buffer 135 and the second ring buffer 145 of the display apparatus 100 may exceed a value obtained by dividing a time, which is required for the image source selecting module 150 to copy an image frame from the first ring buffer 135 and the second ring buffer 145 to the output buffer 161, by the image frame update period Td of the display 163. As such, when the display apparatus 100 stores the broadcasting image and the substitutional advertisement image in the first ring buffer 135 and the second ring buffer 145, it is possible to prevent an oldest frame, which has not yet been displayed in the display 163, from being lost by overwriting by a new frame before display of the oldest frame.

According to an exemplary embodiment, the display apparatus 100 may store the frame of the broadcasting image in the plurality of buffers 135_1, 135_3, and 135_5, in consideration of the period Tb at which the frame of the broadcasting image is updated, and the number of the plurality of buffers 135_1, 135_3, and 135_5.

For example, the display apparatus 100 may respectively store a frame 1, a frame 2, and a frame 3 of the broadcasting image in the first buffer 135_1, the second buffer 135_3, and the third buffer 135_5 and may sequentially display the frame 1, the frame 2, and the frame 3 in the display 163 depending on the frame update period Td of the display 163. The display apparatus 100 may store a frame 4 in the first buffer 135_1 depending on the frame update period Tb of the broadcasting image and may display the frame 4 in the display 163 depending on the frame update period Td of the display 163. When displaying the frame 4 in the display 163, the display apparatus 100 may store a frame 5 in the second buffer 135_3 depending on the frame update period Tb of the broadcasting image.

According to an exemplary embodiment, the display apparatus 100 may store the frame of the substitutional advertisement image in the plurality of buffers 145_1, 145_3, and 145_5, in consideration of the period Tr at which the frame of the substitutional advertisement image is updated, and the number of the plurality of buffers 145_1, 145_3, and 145_5.

For example, when receiving the substitutional advertisement image, the display apparatus 100 may store only a first frame of the substitutional advertisement image in the fourth buffer 145_1. The display apparatus 100 may display the first frame stored in the fourth buffer 145_1 in the display 163 at the start time (or a first time point t1, a temporal transition boundary) of the substitutional advertisement depending on the frame update period Td of the display 163. In other words, the display apparatus 100 may store the first frame of the substitutional advertisement image in the fourth buffer 145_1; if the first frame is displayed in the display 163, the display apparatus 100 may store a second frame of the substitutional advertisement image in the fifth buffer 145_3.

The display apparatus 100 may store a frame 2 in the fifth buffer 145_3 depending on the frame update period Tr of the substitutional advertisement image and may display the frame 2 in the display 163 depending on the frame update period Td of the display 163. In the case where the timing of the frame update period Tr of the substitutional advertisement image does not coincide with the timing of the frame update period Td of an image of the display 163, the display apparatus 100 may continuously display the frame 2 stored in the fifth buffer 145_3 in the display 163 depending on the frame update period Td of the display 163. The display apparatus 100 may store a frame 3 in the sixth buffer 145_5 depending on the frame update period Tr of the substitutional advertisement image and may display the frame 3 in the display 163 depending on the frame update period Td of the display 163. The display apparatus 100 may store a frame 4 in the fourth buffer 145_1 depending on the frame update period Tr of the substitutional advertisement image; in the case where the timing of the frame update period Tr of the substitutional advertisement image does not coincide with the timing of the frame update period Td of an image of the display 163, the display apparatus 100 may continuously display the frame 3 stored in the sixth buffer 145_5, in the display 163 depending on the frame update period Td of the display 163. The display apparatus 100 may display the frame 4 in the display 163 depending on the frame update period Td of the display 163. The display apparatus 100 may sequentially display the frame of the substitutional advertisement image in the display 163. The display apparatus 100 may terminate the display of a frame 7 at the end time (or a second time point t2, a temporal transition boundary) of the substitutional advertisement. In other words, the display apparatus 100 may terminate the displaying of the substitutional advertisement image in the display 163.

According to an exemplary embodiment, the display apparatus 100 may sequentially store the frame of the broadcasting image in the plurality of buffers 135_1, 135_3, and 135_5 depending on the frame update period Tb of the broadcasting image. According to an exemplary embodiment, the display apparatus 100 may verify the first ring buffer 135 at the second time point t2 to display the frame of the broadcasting image, which has been most recently stored, in the display 163. For example, the display apparatus 100 may display a frame 13 stored in the first buffer 135_1 at the second time point t2, in the display 163.

As such, the display apparatus 100 may substitute (replace) frames of the broadcasting image stream with frames from a substitutional advertisement image stream in the display 163 during a playback time tp of the substitutional advertisement image stream included in information about a substitutable broadcasting image (or information about a substitutable advertisement). For example, as shown in FIG. 4, frames 1-7 of the converted substitutional advertisement image stream are displayed instead of frames 5-12 of the converted broadcasting image stream.

According to various exemplary embodiments described with reference to FIGS. 1 to 4, the display apparatus 100 may include at least two or more scalers that convert an image to a specified format; as such, when substituting the broadcasting image received from the broadcasting server 200 with the substitutional advertisement image to display the substitutional advertisement image in the display 163, the display apparatus 100 may convert the substitutional advertisement image through another scaler different from one scaler converting the broadcasting image before the playback of the substitutional advertisement image. Accordingly, the display apparatus 100 may seamlessly display the substitutional advertisement image in the display 163.

Figure 5:
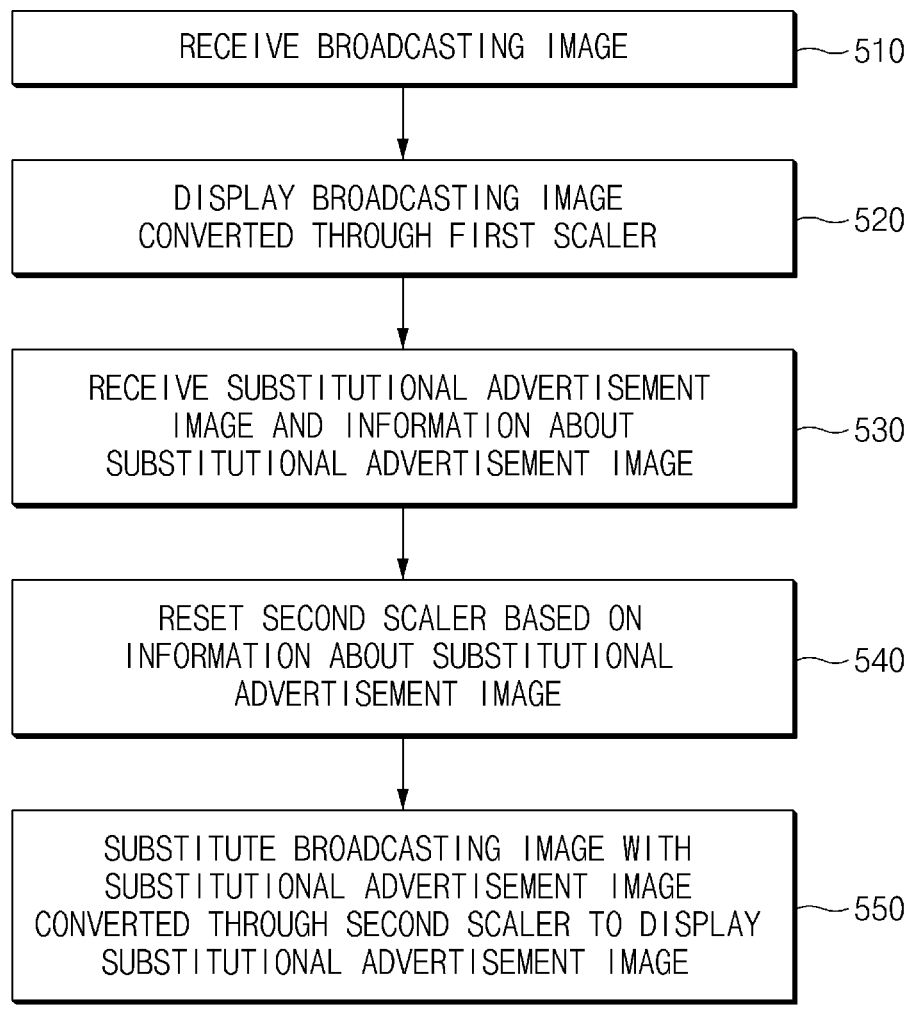
FIG. 5 is a flowchart illustrating a control method of a display apparatus, according to an exemplary embodiment.

FIG. 5 is a flowchart illustrating a control method of a display apparatus, according to an exemplary embodiment.

The flowchart illustrated in FIG. 5 may include operations processed by the above-described display apparatus 100. Therefore, even though there are omitted details below, details about the display apparatus 100 given with reference to FIGS. 1 to 4 may be applied to the flowchart shown in FIG. 5.

According to an exemplary embodiment, in operation 510, the display apparatus 100 may receive a broadcasting image from a broadcasting server. For example, the broadcasting image may include a content image and an advertisement image. The advertisement image may include a substitutable advertisement image.

According to an exemplary embodiment, in operation 520, the display apparatus 100 may display the broadcasting image converted through the first scaler 130, in the display 163. For example, the display apparatus 100 may convert the broadcasting image to a specified format through the first scaler 130 to display the broadcasting image in the display 163.

According to an exemplary embodiment, in operation 530, the display apparatus 100 may receive the substitutional advertisement image and information about the substitutional advertisement image, from the advertisement server 400. For example, the information about the substitutional advertisement image may include information about the format (e.g., a color format, a resolution, or a bit rate) of the substitutional advertisement image.

According to an exemplary embodiment, to convert the format of the substitutional advertisement image to the specified format, in operation 540, the display apparatus 100 may reset (or set) the second scaler 140 based on the information about the substitutional advertisement image.

According to an exemplary embodiment, in operation 550, the display apparatus 100 may substitute the broadcasting image with the substitutional advertisement image converted through the second scaler 140 to display the substitutional advertisement image in the display 163. For example, the display apparatus 100 may display the substitutional advertisement image converted through the second scaler 140, in the display 163 depending on the start time of the substitutional advertisement included in the information about the substitutable advertisement image received from the ACR server 300.

At least a part of an apparatus (e.g., modules or functions thereof) or a method (e.g., operations) according to various exemplary embodiments may be implemented by instructions stored in a computer-readable storage medium in the form of a program module. In some exemplary embodiments, the computer-readable storage medium is a non-transitory computer-readable storage medium. The instruction, when executed by a processor, may cause the processor to perform a function corresponding to the instruction. A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk), an embedded memory, and the like. The instruction may include a code created by a complier or a code executable by an interpreter.

While exemplary embodiments have been shown and described, it will be understood by those skilled in the art that various changes in form and details may be made therein without departing from the spirit and scope of the present disclosure as defined by the appended claims and their equivalents.

What is claimed is:
1. A display apparatus comprising:
a communication interface configured to communicate with a broadcasting server and an advertisement server;
a display;
a first scaler configured to convert a broadcasting image stream received from the broadcasting server;
a second scaler configured to convert a substitutional advertisement image stream received from the advertisement server; and
a processor configured to:
control the communication interface to receive, from the broadcasting server, the broadcasting image stream;
control the first scaler to convert the received broadcasting image stream to broadcasting image data at a specified display format;
store the broadcasting image data converted by the first scaler in a first buffer;
control the display to display a broadcasting image based on the broadcasting image data stored in the first buffer;
control the communication interface to receive, from the advertisement server, the substitutional advertisement image stream;

control the second scaler to convert the substitutional advertisement image stream to substitutional advertisement image data at the specified display format;

store the substitutional advertisement image data converted b the second scaler in a second buffer; and in response to reaching a start time for displaying a substitutional advertisement while the broadcasting image is displayed, control the display to display a substitutional advertisement image based on the substitutional advertisement image data stored in the second buffer instead of displaying the broadcasting image.

2. The display apparatus of claim 1, wherein the specified display format includes at least one of a color format, a resolution, and a frame rate.

3. The display apparatus of claim 1, wherein the processor is further configured to:

control the communication interface to receive information about the substitutional advertisement image stream; and set a setting value of the second scaler based on the information about the substitutional advertisement image stream.

4. The display apparatus of claim 1, wherein the first buffer includes a first plurality of ring and the second buffer includes a second plurality of ring buffers.

5. The display apparatus of claim 4, wherein the processor is further configured to:

control the second scaler to store a first frame of the substitutional advertisement image stream in a first ring buffer of the second plurality of ring buffers; and when the first frame is displayed on the display, control the second scaler to store a second frame of the substitutional advertisement image stream in a second ring buffer of the second plurality of ring buffers.

6. The display apparatus of claim 4, wherein a number of ring buffers in the first buffer exceeds a value obtained by dividing a time, which is required to copy an oldest frame stored in the first buffer to the display, by an image update period of the display, thereby avoiding a particular buffer of the first buffer being overwritten before the oldest frame is displayed.

7. The display apparatus of claim 4, wherein the processor is configured to control the display to display a particular frame, at a point in time when a playback of the substitutional advertisement image ends, and wherein the particular frame has been most recently stored in the first buffer.

8. The display apparatus of claim 3, wherein the information about the substitutional advertisement image stream includes at least one of:

information about a color format of the substitutional advertisement image stream, information about a resolution of the substitutional advertisement image stream, and information about a frame rate of the substitutional advertisement image stream.

9. A control method of a display apparatus, the control method comprising:

receiving a broadcasting image stream from a broadcasting server;

converting, by using a first scaler, the received broadcasting image stream to broadcasting image data at a specified display format;

storing the broadcasting image data in a first buffer;

displaying a broadcasting image, based on the broadcasting image data stored in the first buffer, on a display of the display apparatus;

receiving a substitutional advertisement image stream from an advertisement server;

converting, by using a second scaler, the substitutional advertisement image stream to substitutional advertisement image data at the specified display format;

storing the substitutional advertisement image data in a second buffer; and in response to reaching a start time for displaying a substitutional advertisement while the broadcasting image is displayed, displaying, on the display, a substitutional advertisement image based on the substitutional advertisement image data stored in the second buffer instead of the broadcasting image.

10. The control method of claim 9, format includes at least one of a color format, a resolution, and a frame rate.

11. The control method of claim 9, further comprising:

receiving information about the substitutional advertisement image stream; and setting a setting value of the second scaler based on the information about the substitutional advertisement image stream.

12. The control method of claim 9, wherein the first buffer includes a first plurality of ring buffers and the second buffer includes a second plurality of ring buffers.

13. The control method of claim 12, wherein the displaying of the substitutional advertisement image stream comprises:

controlling the second scaler to store a first frame of the substitutional advertisement image stream in a first ring buffer of the second plurality of ring buffers; and when the first frame is displayed on the display, controlling the second scaler to store a second frame of the substitutional advertisement image stream in a second ring buffer of the second plurality of ring buffers.

14. The control method of claim 12, wherein a number of buffers in the first buffer exceeds a value obtained by dividing a time, which is required to copy an oldest frame stored in the first buffer to the display, by an image update period of the display, thereby avoiding a particular buffer of the first buffer being overwritten before the oldest frame is displayed.

15. The control method of claim 12, further comprising controlling the display to display a particular frame at a point in time when a playback of the substitutional advertisement image ends, wherein the particular frame has been most recently stored in the first buffer.

16. The control method of claim 11, wherein the information about the substitutional advertisement image stream includes at least one of:

information about a color format of the substitutional advertisement image stream, information about a resolution of the substitutional advertisement image stream, and information about a frame rate of the substitutional advertisement image stream.

17. A non-transitory computer-readable recording medium having recorded thereon a program performing a control method of a display apparatus, the method comprising:

receiving a broadcasting image stream from a broadcasting server;

converting, by using a first scaler, the received broadcasting image stream to broadcasting image data at a specified display format;

storing the broadcasting image data in a first buffer;

displaying a broadcasting image, based on the broadcasting image data stored in the first buffer, on a display apparatus;

receiving, from an advertisement server, a substitutional advertisement image stream;

converting, by using a second scaler, the substitutional advertisement image stream to substitutional advertisement image data at the specified display format;

storing the substitutional advertisement image data in a second buffer; and in response to reaching a start time for displaying a substitutional advertisement while the broadcasting image is displayed, displaying a substitutional advertisement image instead of the broadcasting image based on the substitutional advertisement image data stored in the second buffer.

18. The non-transitory computer-readable recording medium of claim 17, wherein the first buffer includes a first plurality of ring buffers and the second buffer includes a second plurality of ring buffers.

19. The non-transitory computer-readable recording medium of claim 18, wherein the displaying of the substitutional advertisement image comprises:

controlling the second scaler to store a first frame of the substitutional advertisement image stream in a first ring buffer of the second plurality of ring buffers; and when the first frame is displayed on the display, controlling the second scaler to store a second frame of the substitutional advertisement image stream in a second ring buffer of the second plurality of ring buffers.

20. The non-transitory computer-readable recording medium of claim 18, wherein the method further comprises:

controlling the display to display a particular frame at a point in time when a playback of the substitutional advertisement image stream ends, wherein the particular frame has been most recently stored in the first buffer.

* * * * *